United States Patent [19]

Tohdo

[11] Patent Number: 5,458,456
[45] Date of Patent: Oct. 17, 1995

[54] METHOD AND APPARATUS FOR TEMPORAL STORING AND CONVEYING OF PLATE SHAPED MEMBERS

[75] Inventor: Michiharu Tohdo, Kawasaki, Japan

[73] Assignee: Keisoku Industry Co., Ltd., Tokyo, Japan

[21] Appl. No.: 59,746

[22] Filed: May 12, 1993

[30] Foreign Application Priority Data

May 13, 1992 [JP] Japan .................................. 4-120701
May 13, 1992 [JP] Japan .................................. 4-120709

[51] Int. Cl.$^6$ .................................................. B65G 3/08
[52] U.S. Cl. ..................... 414/798.9; 271/31.1; 271/129; 271/150; 414/786
[58] Field of Search ................................. 271/31.1, 129, 271/150, 149; 414/798.9, 786

[56] References Cited

U.S. PATENT DOCUMENTS

| | | | |
|---|---|---|---|
| 3,031,186 | 4/1962 | Galloway | 271/31.1 X |
| 4,697,973 | 10/1987 | Hahn et al. | 271/31.1 X |
| 4,701,094 | 10/1987 | Courjaret et al. | 271/129 X |

FOREIGN PATENT DOCUMENTS

| | | | |
|---|---|---|---|
| 0053857 | 6/1982 | European Pat. Off. | |
| 7236286 | 1/1973 | Germany | |
| 2724388 | 12/1978 | Germany | |
| 1217578 | 12/1970 | United Kingdom | 271/31.1 |

Primary Examiner—Michael S. Huppert
Assistant Examiner—Janice L. Krizek
Attorney, Agent, or Firm—Burns, Doane, Swecker & Mathis

[57] ABSTRACT

A continuous and sequential temporal storing and conveying of plate shaped members to the next processing step, in which the differently sized and randomly ordered plate shaped members can be easily handled and manipulated, A substantially vertical wall surface is provided and the plate shaped members are temporarily stored in a state of leaning against the wall surface and sequentially fed toward the wall surface. Then, a nearest-to-wall plate shaped member among the stored plate shaped members is drawn to the wall surface in order to vertically erect the nearest-to-wall plate shaped member and separate the nearest-to-wall plate shaped member from remaining stored plate shaped members. Then, the vertically erected nearest-to-wall plate shaped member is conveyed to the next processing step along the wall surface.

20 Claims, 15 Drawing Sheets

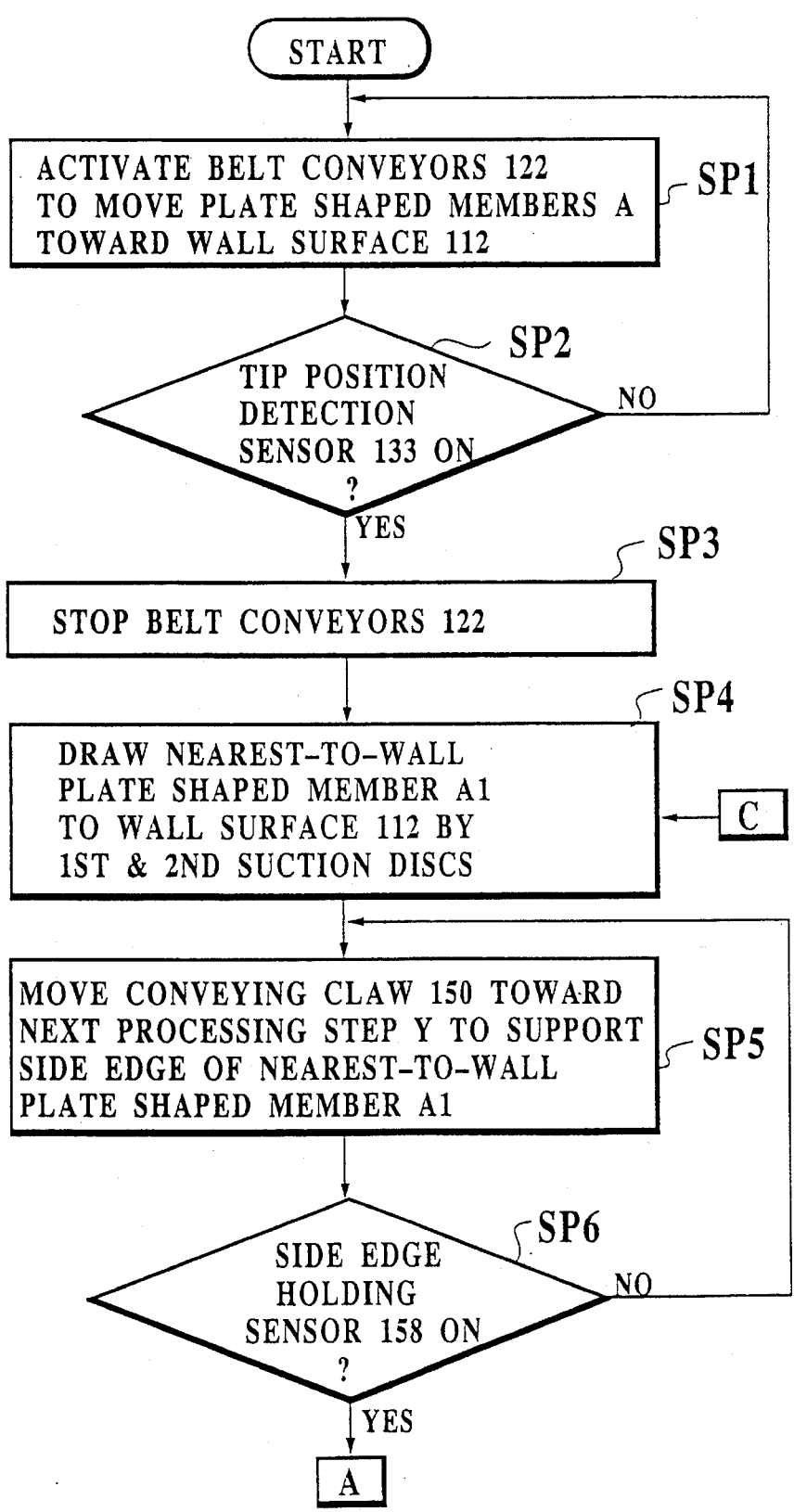

METHOD AND APPARATUS FOR TEMPORAL STORING AND CONVEYING OF PLATE SHAPED MEMBERS

BACKGROUND OF THE INVENTION

1. Field of the Invention

The present invention relates to a temporal storing and a conveying of plate shaped members, in which a plurality of plate shaped members are stored one by one and conveyed to a next processing step one by one.

2. Description of the Background Art

A conventionally known apparatus of this type of temporal storing and conveying of plate shaped members has been that in which the plate shaped members are stored by being piled up one on top of the other vertically, and the stored plate shaped members are conveyed to the next processing step by taking out the plate shaped members one by one either from a top of the pile or from a bottom of the pile sequentially.

Here, in the conventional apparatus in which the plate shaped members are taken out one by one from a top of the pile, new plate shaped members cannot be supplied for a temporal storing until all of the already piled plate shaped members are taken out, so that the conveying of the plate shaped members inevitably becomes intermittent.

On the other hand, in the conventional apparatus in which the plate shaped members are taken out one by one from a bottom of the pile, it is possible to take out the already stored plate shaped member from the bottom of the pile while supplying a new plate shaped member to a top of the pile, so that the conveying of the plate shaped members can be made continuous.

However, in this type of the conventional apparatus, the total weight of the piled plate shaped members is exerted onto the plate shaped member at the bottom of the pile, so that it requires a large force to pull out the plate shaped member at the bottom of the pile from the pile for the purpose of conveying the plate shaped member to the next processing step, and there is a possibility of damaging the plate shaped member at a time of pulling it out from the pile. In addition, in a case where the plate shaped members are corrugated cardboards, the corrugation of the corrugated cardboard can be crushed by the total weight to be exerted onto the plate shaped member at the bottom of the pile.

Moreover, in this type of conventional apparatus, in order to supply the new plate shaped member to a top of the pile, it has been necessary to lift up each new plate shaped member to a sufficient height and then drop it on the pile. Consequently, this type of conventional apparatus requires a considerable amount of work for lifting up each new plate shaped member to the sufficient height. In addition, the impact of the dropping each new plate shaped member over the pile can stir up dust on the already piled plate shaped members such that the room in which this type of the conventional apparatus is installed can be made quite dusty.

Furthermore, in either type of the conventional apparatus, it has been impossible to store the plate shaped members in different sizes in random order and sequentially convey these differently sized plate shaped members piled in the random order. It has also been quite impossible in either type of the conventional apparatus for a plate shaped member of a desired size to be thrust between the already stored plate shaped members, or removed from the pile of the already stored plate shaped members.

SUMMARY OF THE INVENTION

It is therefore an object of the present invention to provide a method and an apparatus for temporal storing and conveying of plate shaped members, capable of sequentially conveying the plate shaped members to the next processing step continuously, without damaging the stored plate shaped members, without requiring a large amount of work for the supply of new plate shaped members, and without making the installation site dusty.

It is another object of the present invention to provide a method and an apparatus for temporal storing and conveying of plate shaped members, capable of sequentially conveying the plate shaped members in different sizes stored in a random order.

It is another object of the present invention to provide a method and an apparatus for temporal storing and conveying of plate shaped members, in which a plate shaped member of a desired size can be thrusted between the already stored plate shaped members, or removed from the already stored plate shaped members.

According to one aspect of the present invention there is provided an apparatus for temporal storing and conveying of plate shaped members, comprising: a substantially vertical wall surface; feeding means for temporarily storing the plate shaped members in a state of obliquely leaning against the wall surface, and feeding the stored plate shaped members toward the wall surface sequentially; separation means for drawing a nearest-to-wall plate shaped member among the stored plate shaped members to the wall surface in order to vertically erect the nearest-to-wall plate shaped member along the wall surface and separate the nearest-to-wall plate shaped member from remaining stored plate shaped members; and conveying means for conveying the vertically erected nearest-to-wall plate shaped member to a next processing step along the wall surface.

According to another aspect of the present invention there is provided a method for temporal storing and conveying of plate shaped members, comprising the steps of: (a) providing a substantially vertical wall surface; (b) temporarily storing a plurality of plate shaped members in a state of obliquely leaning against the wall surface, and sequentially feeding the stored plate shaped members toward the wall surface; (c) drawing a nearest-to-wall plate shaped member among the stored plate shaped members to the wall surface in order to vertically erect the nearest-to-wall plate shaped member along the wall surface and separate the nearest-to-wall plate shaped member from remaining stored plate shaped members; and (d) conveying the vertically erected nearest-to-wall plate shaped member to a next processing step along the wall surface.

Other features and advantages of the present invention will become apparent from the following description taken in conjunction with the accompanying drawings.

BRIEF DESCRIPTION OF THE DRAWINGS

FIG. 11 is a diagram showing how FIGS. 11A–11C fit together.

FIGS. 11A–11C depict a flow chart for the conveying operation to be carried out by the apparatus of FIG. 1.

DETAILED DESCRIPTION OF THE PREFERRED EMBODIMENTS

Now, one embodiment of a method and an apparatus for temporal storing and conveying of plate shaped members according to the present invention will be described in detail with reference to the drawings.

Figure 1:
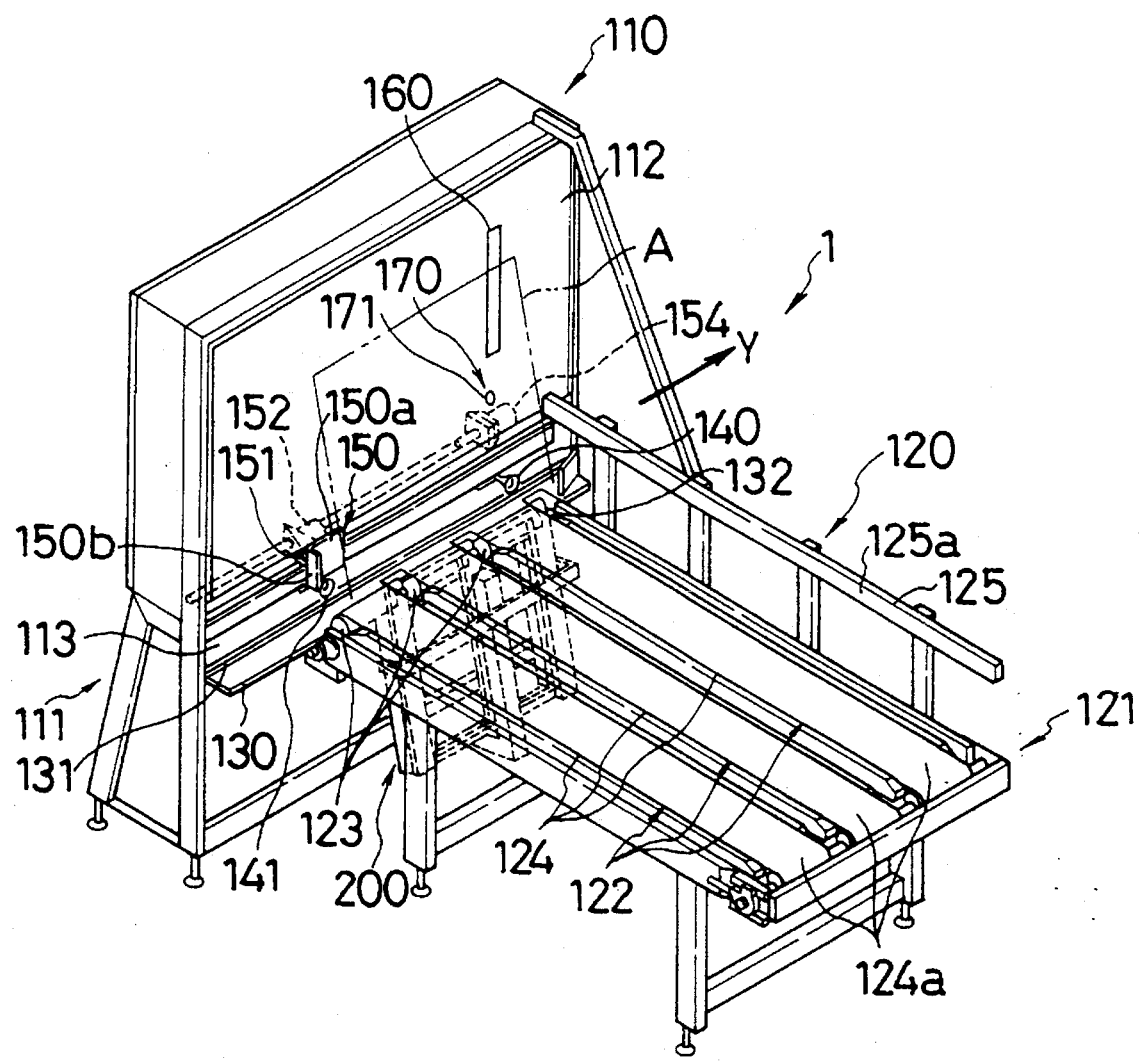
FIG. 1 is a perspective view of one embodiment of an apparatus for temporal storing and conveying of plate shaped members according to the present invention.

FIG. 1 shows an overall configuration of the apparatus 1 of this embodiment for temporarily storing plate shaped members A and sequentially conveying each of the plate shaped members A to the next processing step Y, which generally comprises: a wall unit 110 extending vertically, and a feeding unit 120 located next to the wall unit 110 and extending horizontally, such that the plate shaped members A can be temporarily stored in a state of leaning against the wall unit 110 and sequentially fed toward the wall unit 110 by the feed unit 120.

In the following, a description will be given for an exemplary case in which each of the plate shaped members A is a folded plate shaped corrugated cardboard in two folds which can be assembled into a cardboard box.

As shown in FIG. 1, the wall unit 110 has a wall frame 111 on which a flat wall surface 112 having a smooth surface made of a polished stainless plate is mounted vertically. On the other hand, the feeding unit 120 has a bed frame 131 equipped with three belt conveyors 122 extending horizontally on a plane perpendicular to the wall surface 112. These three belt conveyors 122 are formed by three conveyor belts 124 driven by three driving rollers 123 connected to an identical driving shaft (not shown in FIG. 1).

The driving rollers 123 are located approximately below the wall surface 112 and arranged in parallel to the wall surface 112, while the conveyor belts 124 have their conveyor surfaces 124a extending horizontally. The conveyor surfaces 124a of the conveyor belts 124 are made of a material having a large friction coefficient such as a rubber.

The bed frame 121 is also equipped with a guide bar 125 on one side facing toward the next processing step Y, where the guide bar 125 has a guiding surface 125a extending along a conveying direction of the belt conveyors 122, such that the side edges of the plate shaped members A facing toward the next processing step Y which are leaning against the wall surface 112 and temporarily stored on the belt conveyors 122 can be aligned along this guiding surface 125a.

Figure 2:
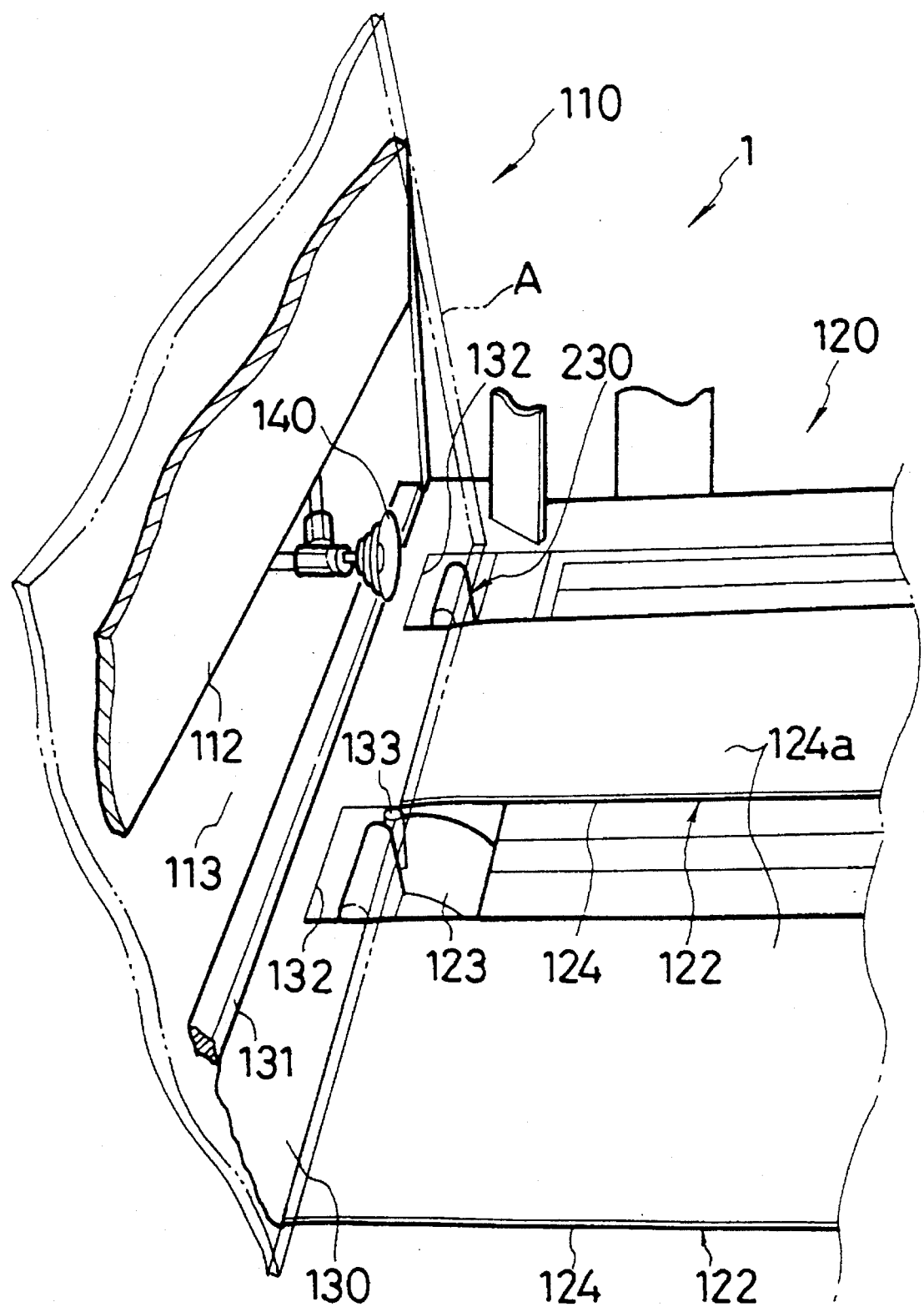
FIG. 2 is an enlarged perspective view of a flat plate portion of the apparatus of FIG. 1.

As shown in FIGS. 1 and 2, below the wall surface 112, there is provided a flat plate 130 extending horizontally in the direction of the next processing step Y, which is located very closely along the portion of conveyor belts 124 wound around the driving rollers 123. The flat plate 130 is made of a stainless plate having a polished upper surface. The flat plate 130 incorporates three grooves 122 at positions next to the driving rollers 123 toward the next processing step Y, where each groove 132 has a width approximately equal to an interval between adjacent driving rollers 123. In addition, directly below the wall surface 112, there is provided a guide railing 131 along the flat plate 130, which is located on the same horizontal plane on which the wall surface 112 is located.

Also, as shown in FIG. 2, in the second groove 132 from the next processing step Y side, there is provided a tip position detection sensor 133 for detecting an edge of the plate shaped member A1 which is nearest to the wall surface 112 (referred hereafter as the nearest-to-wall plate shaped member A1). This tip position detection sensor 133 is provided next to an edge of the driving roller 123 at the second groove 132, which is one of the driving rollers 123 closest to the next processing step Y, such that this tip position detection sensor 133 does not interfere with plate shaped claws 220 to be described below. This tip position detection sensor 133 has its location movable in a direction toward the wall surface 112, such that it can detect the nearest-to-wall plate shaped member A1 just before being transferred from the conveyor belt 124 to the flat plate 130, and generate a signal for stopping the belt conveyor 122.

Figure 3:
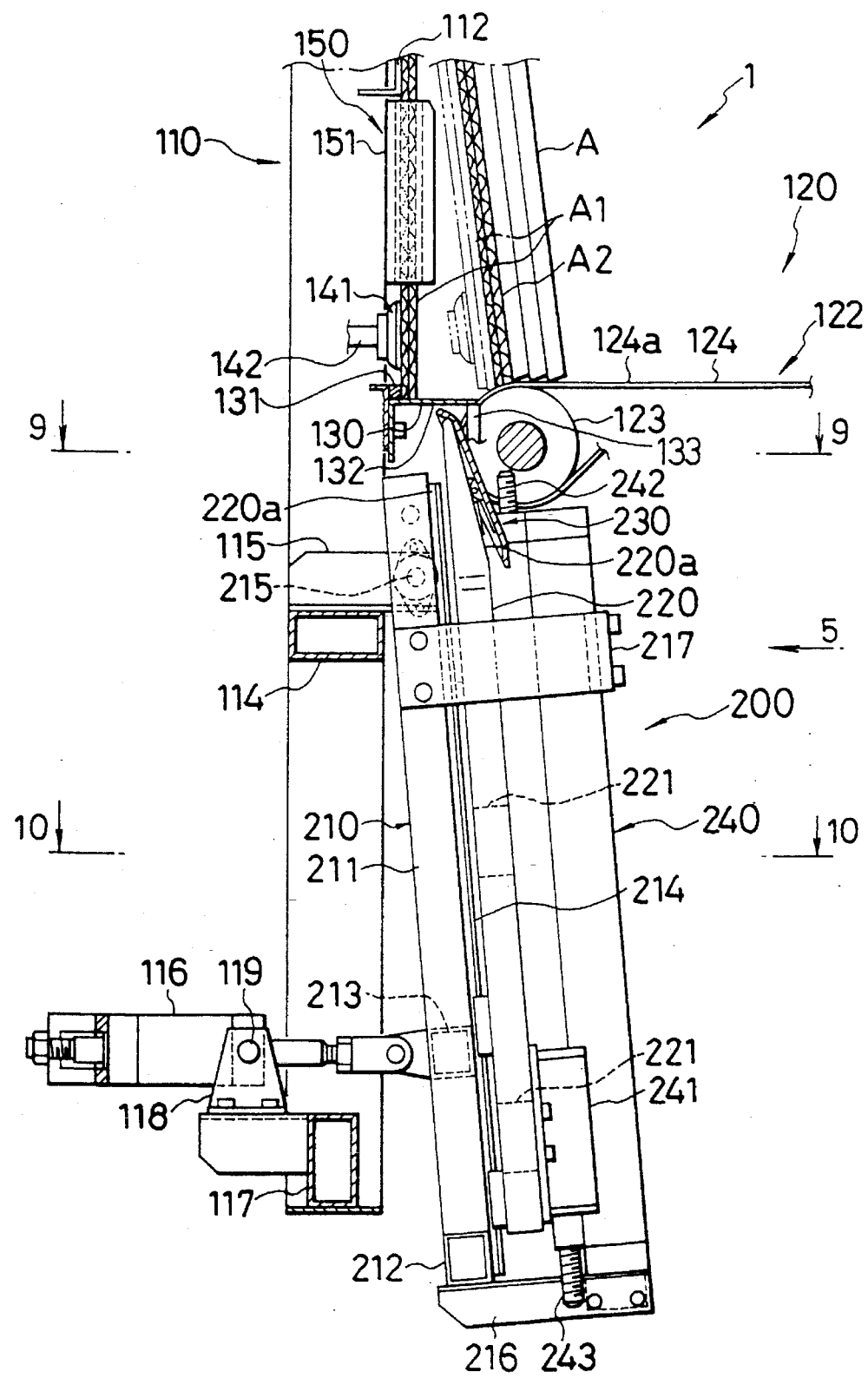
FIG. 3 is an enlarged side view of a leaning force mitigation member portion of the apparatus of FIG. 1.

At this point, the nearest-to-wall plate shaped member A1 is supported in a state in which its lower edge portion facing away from the wall portion 112 is in contact with the conveyor belt 124, such that its lower edge portion is at a position slightly upwards from the flat plate 130. The nearest-to-wall plate shaped member A1 will be drawn to the wall surface 112 by means of a first suction disc 140 and a second suction disc 141, as indicated in FIGS. 1 to 3.

The first and second suction discs 140 and 141 are normally located in a space 113 formed between the wall surface 112 and the flat plate 130, at positions inwards from the wall surface 112, and at a time of drawing the nearest-to-wall plate shaped member A1 to the wall surface 112, they are projected outwards from the space 113 to suck onto a surface of the nearest-to-wall plate shaped member A1 and then pulled back to the space 113 so as to draw the nearest-to-wall plate shaped member A1 against the wall surface 112.

The first suction disc 140 is located near the guide bar 125 at a fixed position in a direction along the wall surface 112.

The second suction disc 141 is attached to a conveying claw 150 to be described below, such that it can move along with the conveying claw 150 in a direction along the wall surface 112. Here, as shown in FIG. 3, the second suction disc 141 is attached to the conveying claw 150 through an elastic member 142 so that it is movable relative to the conveying claw 150 in the direction along the wall surface 112 within a range of the elastic deformation of the elastic member 142.

Figure 4:
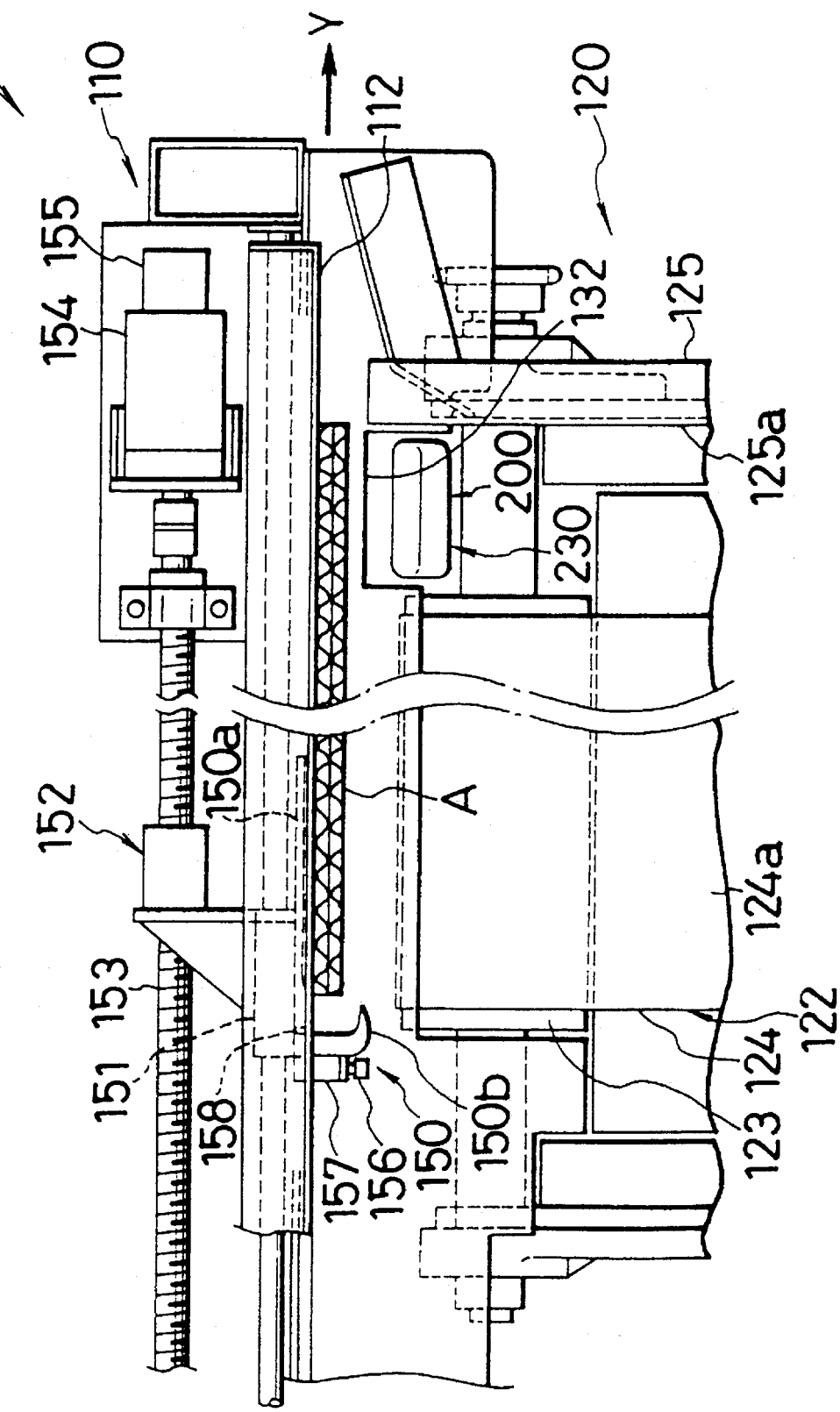
FIG. 4 is an enlarged top plan view of a conveying claw portion of the apparatus of FIG. 1.

As shown in FIG. 4, the conveying claw 150 conveys the nearest-to-wall plate shaped member A1 drawn to the wall surface 112 by pushing it to slide along the flat plate 130 toward the next processing step Y, and comprises a palm portion 150a located at the space 113 on a plane on which the wall surface 112 is located, and a claw portion 150b having a hook-like cross sectional shape to hold the side edge portion of the nearest-to-wall plate shaped member A1 which is extending out from the end of the palm portion 150a away from the next processing step Y. The palm portion 150a of this conveying claw 150 is attached to a linear bearing 151 and a ball screw 152.

The linear bearing 151 guides the conveying claw 150 to be freely slidable in a direction along the wall surface 112, while the ball screw 152 moves the conveying claw 150 along the linear bearing 151 as a screw bolt 153 thrusted through it in engagement is turned. The screw bolt 153 is turned by a servo motor 154 attached at one end of the screw bolt 153, and thus servo motor 154 is equipped with an absolute encoder 155 for determining the position of the conveying claw 150 with respect to the screw bolt 153 according to the angle of rotation of the screw bolt 153 turned by the servo motor 154.

The absolute encoder 155 has an origin set to a position at which a side edge detection sensor 156 to be described below which is provided on the conveying claw 150 detects the guiding surface 125a of the guide bar 125, such that the absolute encoder 155 can measure a distance between the side edge detection sensor 156 and the guiding surface 125a. Consequently, when the side edge detection sensor 156 detects the side edge of the plate shaped member A facing away from the next processing step Y, the value indicated by the absolute encoder 155 at that time indicates the width of the plate shaped member. Thus, the side edge detection sensor 156, the ball screw 152, the servo motor 154, and the absolute encoder 155 collectively constitute means for determining a size of a width of the plate shaped member A.

Figure 8:
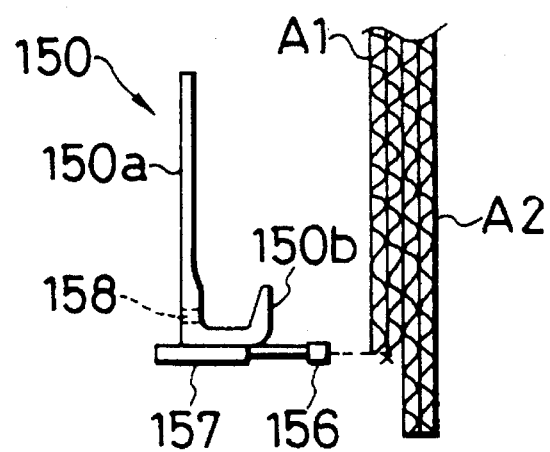
FIG. 8 is an enlarged view of a conveying claw in the apparatus of FIG. 1.

As shown in FIG. 8, the side edge detection sensor 156 is provided at a tip of a side edge detection air cylinder 157 which is attached on a back side of the claw portion 150b of the conveying claw 150 facing away from the next processing step Y. This side edge detection sensor 156 detects the side edge of the next nearest-to-wall plate shaped member A1, after the previous nearest-to-wall plate shaped member A1 drawn to the wall surface 112 was conveyed out to the next processing step Y by the conveying claw 150, as the conveying claw 150 returns to its starting position. The side edge detection air cylinder 157 can bring the side edge detection sensor 156 close to the nearest-to-wall plate shaped member A1 by extending its rod, such that the change of the thickness of the nearest-to-wall plate shaped member A1 can be detected by the side edge detection sensor 156.

Namely, when the rod of the side edge detection air cylinder 157 is extended, the side edge detection sensor 156 can detect the light emitted from it and reflected back to it off the nearest-to-wall plate shaped member A1, even when the light is reflected at approximately ½ of a thickness of the plate shaped member A further away from the surface of the nearest-to-wall plate shaped member A1. As a result, even when the width of the second-nearest-to-wall plate shaped member A2 is wider than the width of the nearest-to-wall plate shaped member A1, the side edge of the nearest-to-wall plate shaped member A1 can be detected by the side edge detection sensor 156 properly. In addition, the palm portion 150a of the conveying claw 150 is also equipped with a side edge holding sensor 158 for detecting the holding of the side edge of the nearest-to-wall plate shaped member A1 by the claw portion 150b of the conveying claw 150.

Also, below the flat plate 130, there is provided a leaning force mitigation member 200 for mitigating the leaning force exerted by the plate shaped members A toward the wall surface 112 side. As shown in FIG. 3, this leaning Force mitigation member 200 comprises a swaying frame 210 attached to be freely swayable at an upper beam 114 of the wall frame 111 located directly below the wall surface 112 in the wall unit 110, and plate shaped claws 220 provided on the swaying frame 210 which are projecting upwards through the grooves 132 on the flat plate 130.

Figure 9:
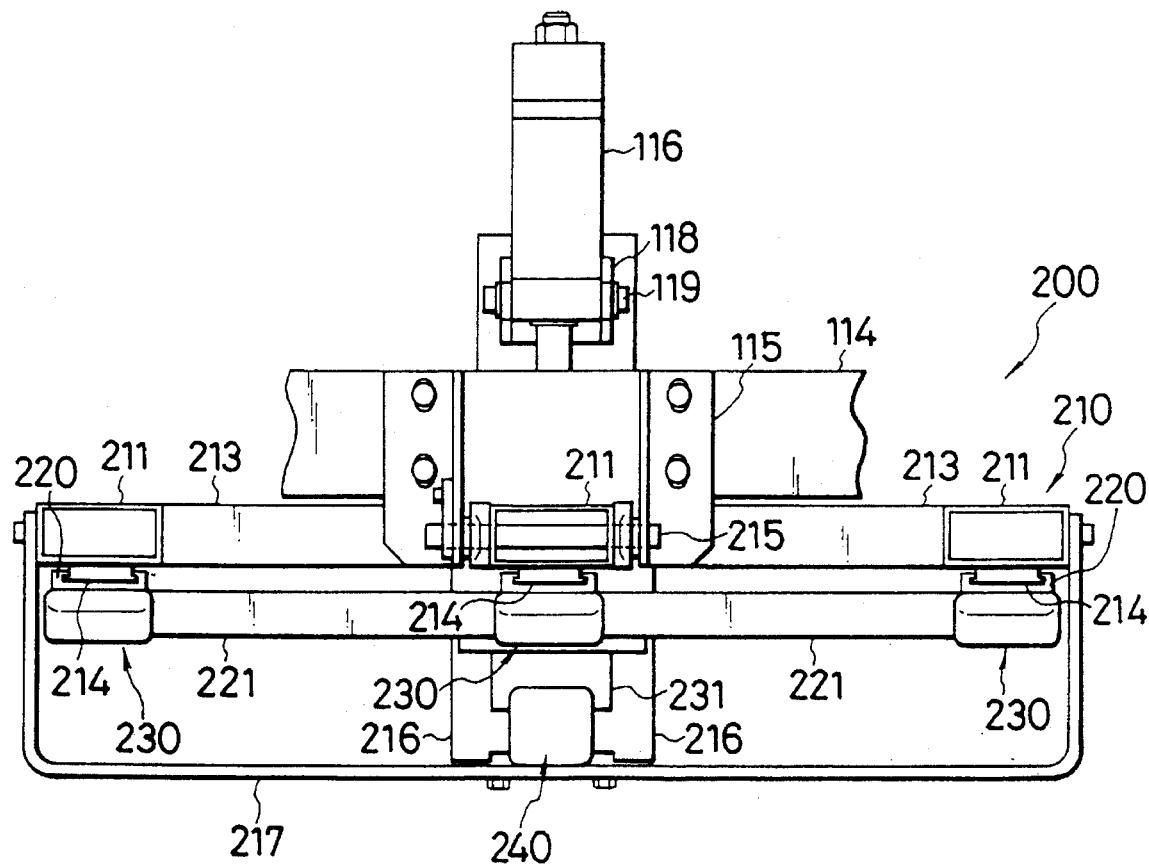
FIG. 9 is an enlarged horizontal cross sectional view of a leaning force mitigation member portion of the apparatus of FIG. 1 at 9—9 plane indicated in FIG. 3.
Figure 10:
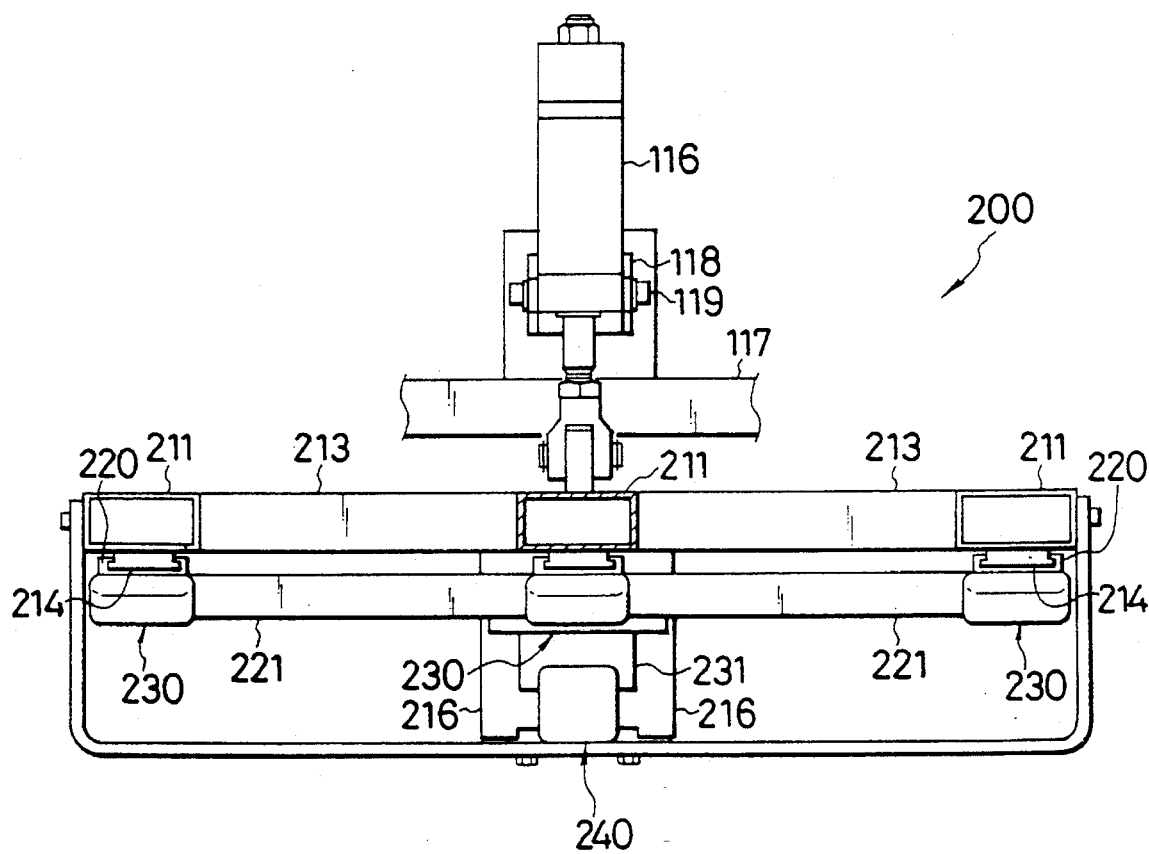
FIG. 10 is an enlarged horizontal cross sectional view of a leaning force mitigation member portion of the apparatus of FIG. 1 at 10—10 plane indicated in FIG. 3.

As shown in FIGS. 3, 5, 9, and 10, the swaying frame 210 comprises three vertically extending main posts 211, a first joint beam 212 for joining the lower edges of these three main posts 211, and a second joint beam 213 for joining lower middle portions of these three main posts 213. Each of the main posts 211 is equipped with guide rails 214 for guiding the plate shaped claws 220 in a vertical direction. As shown in FIGS. 3 and 9, this swaying frame 210 has an upper portion of the central main post 211 attached to an upper bracket 115 provided on the upper beam 114 through a pin 215. In addition, as shown in FIGS. 3 and 10, a lower portion of the central main post 211 is attached to the rod of a swaying cylinder 116. The swaying cylinder 116 is formed by an air cylinder which is provided to be freely rotatable to a lower bracket 118 provided on a lower beam 117 of the wall frame 111 through a pin 119. The plate shaped claws 220 are provided on main posts 211 and joined together by a joint member 221. As shown in FIGS. 3 and 6, a tip of each plate shaped claw 220 has an oblique face 220a on a side facing away from the wall surface 112. On the oblique surface 220a, a pushing member 230 is mounted for pushing up the plate shaped members A from below when the plate shaped claws 220 are projected upwards through the grooves 132 on the flat plate 130.

Figure 6:
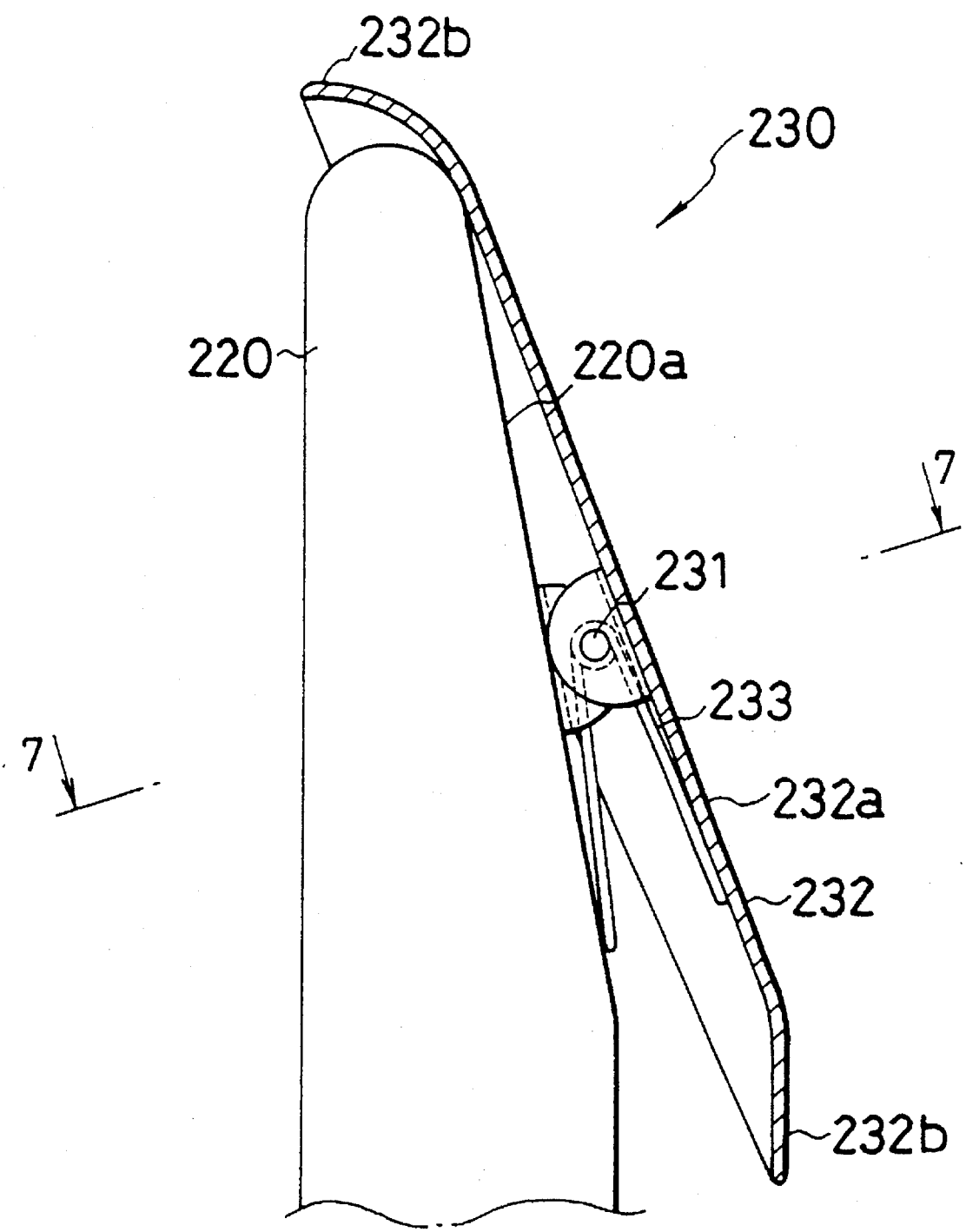
FIG. 6 is an enlarged side view of a pushing member portion of the apparatus of FIG. 1.
Figure 7:
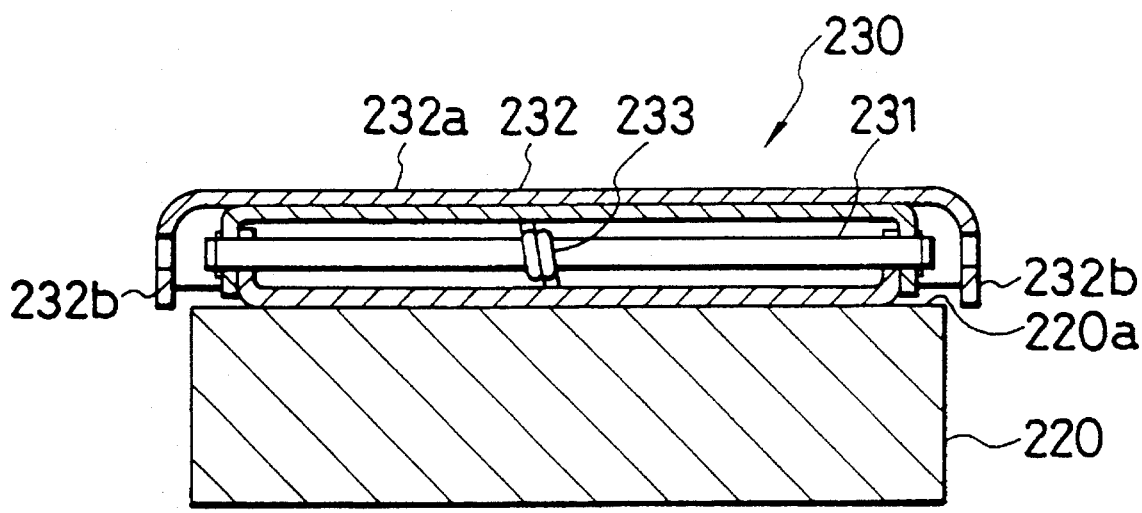
FIG. 7 is an enlarged cross sectional view of a pushing member portion of the apparatus of FIG. 1 at 7—7 plane indicated in FIG. 6.

As shown in FIGS. 6 and 7, each pushing member 230 comprises a horizontally extending pin member 231 attached to a middle of the oblique surface 220a, pushing plate 232 provided to be freely rotatable around the pin member 231, and a torsion spring 233 for pressing the tip portion of the pushing plate 232 makes a contact with a tip of the oblique face 220a. The pushing plate 232 is formed by a polished stainless plate, which has an elongated rectangular flat plate face 232a along the oblique face 220a and a curved peripheral face 232b extending around the flat plate face 232a to surround the peripheral portion of the oblique face 220a.

Figure 5:
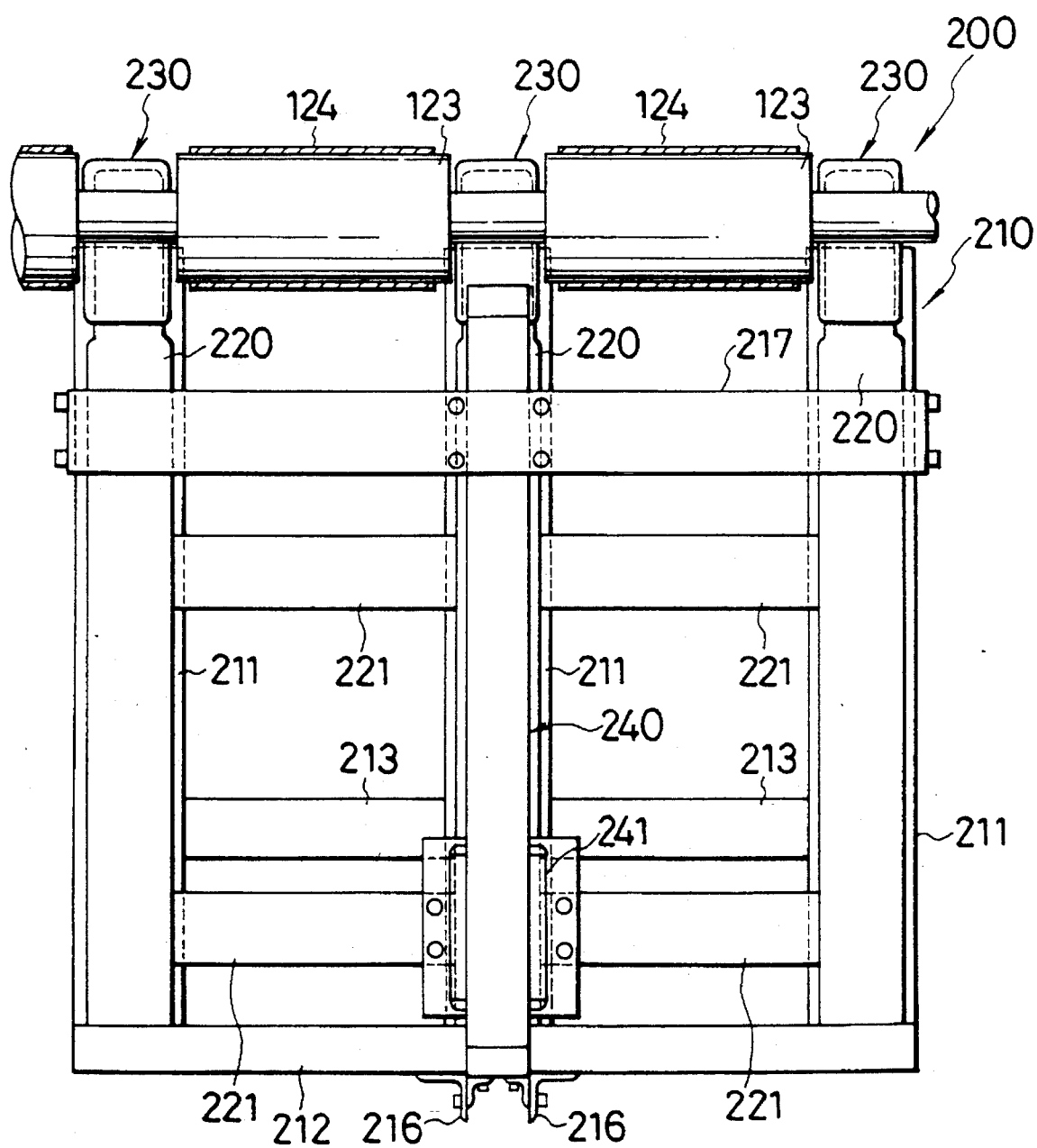
FIG. 5 is an enlarged front view of a leaning force mitigation member portion of the apparatus of FIG. 1.

As shown in FIGS. 3 and 5, the swaying frame 210 is also equipped with an air cylinder 240 for sliding the plate shaped claws 220 along the guide rails 214 provided on the main posts 211. This air cylinder 240 is formed by a rodless air cylinder in which a cylinder body 241 is moved up and down in accordance with a piston mechanism provided within the cylinder body 241.

The cylinder body 241 has its stroke limited by an upper stopper 242 and a lower stopper 243, and connected with the central one of the plate shaped claws 220. This air cylinder 240 has its lower end portion supported by a lower end support bracket 216 provided on the first joint beam 212, and its upper peripheral face portion supported by a peripheral face support bracket 217 straddling over the left and right ones of the main posts 211.

Also, as shown in FIG. 1, on the wall surface 112., there is provided a vertically elongated image sensor 160 for detecting a height of the nearest-to-wall plate shaped member A1. In addition, on the wall surface 112, there is also provided an inclination adjustment member 170 for adjusting the inclination of the nearest-to-wall plate shaped member A1 with a small height among the plate shaped members A with random heights to be equal to the inclination of the taller plate shaped member A arranged behind this nearest-to-wall plate shaped member A1 which is contacting with the wall surface 112. This inclination adjustment member 170 adjusts the inclination of the small nearest-to-wall plate shaped member A1 by extending its rod 171 against the nearest-to-wall plate shaped member 170 until the small nearest-to-wall plate shaped member A1 has the same inclination as that of the taller plate shaped member A arranged behind this nearest-to-wall plate shaped member A1 which is contacting with the wall surface 112, whenever the image sensor 160 detects that the taller plate shaped member A is contacting the wall surface 112 as the nearest-to-wall plate shaped member A1 is small.

This inclination adjustment member 170 is formed by an air cylinder which generates a quite small pushing force sufficient for adjusting the inclination of only a small number of plate shaped members A, such that the damaging of the plate shaped members A in forms of corrugated cardboards by this inclination adjustment member 170 is prevented. Also, this inclination adjustment member 170 contracts its rod 171 completely when the nearest-to-wall plate shaped member A1 is to be drawn to the wall surface 112 by the first and second suction discs 140 and 141.

Next, the operation of the apparatus of this embodiment having the configuration as described above realizing the method for temporal storing and conveying of plate shaped member according to the present invention will be described in detail with reference to the drawings.

In short, in this embodiment, the plate shaped members A are temporarily stored in a state of obliquely leaning against the wall surface 112 while they are sequentially moved toward the wall surface 112 by the belt conveyor 122, and they are sequentially conveyed to the next processing step Y along the wall surface 112 by drawing the nearest-to-wall plate shaped member A1 at each moment to the wall surface 112 sequentially.

More specifically, this operation of the apparatus of this embodiment is carried out according to the flow chart of FIG. 11 as follows. Here, it is to be noted that all of the operations involved in the following procedure can be automatically controlled by a control device (not shown) except for an operation to supply the plate shaped members A to the feeding unit 120.

First, a plurality of plate shaped members A are mounted onto the feeding unit 120 in a state of obliquely leaning against the wall surface 112. At this point, the plate shaped members A of different sizes can be supplied in a random order. Also, at this point, the side edges of the plate shaped members A on the next processing step Y side are aligned with each other by abutting the side edge of each plate shaped member A to the guiding face 125a of the guide bar 125.

Then, at the step SP1, the belt conveyor 122 is activated to move the entire plate shaped members A toward the wall surface 112. As a result, the lower edge of the nearest-to-wall plate shaped member A1 is moved toward the wall surface 112 side such that the lower edge can be detected by the tip position detection sensor 133.

At the step SP2, whether the tip position detection sensor 133 is in an ON state indicating the detection of the lower edge of the nearest-to-wall plate shaped member A1 or not is judged. In case the tip position detection sensor 133 is in the ON state, the process proceeds to the step SP3 at which the belt conveyor 122 is stopped, whereas otherwise the process returns to the step SP1 described above to further move the entire plate shaped members A toward the wall surface 112 until the lower edge of the nearest-to-wall plate shaped member A1 is detected by the tip position detection sensor 133 at the step SP2.

At this point, as shown in FIG. 3, the nearest-to-wall plate shaped member A1 has its lower edge on the side facing away from the wall surface 112 supported in contact with the conveyor belts 124 such that a vertical position of the lower edge is slightly above the flat plate 130.

Also, at this point, a highest vertical position of the upper edge of one of the plate shaped members A that are in contact with the wall surface 112 is scanned from a lower side toward the upper side of the wall surface 112 by the image sensor 160. In a case the image sensor 160 detects the presence of the taller plate shaped member A in contact with the wall surface 112 which is arranged behind the nearest-to-wall plate shaped member A1, the inclination adjustment unit 170 extends its rod 171 outwards against the nearest-to-wall plate shaped member A1 so as to adjust the inclination of the nearest-to-wall plate shaped member A1 to the same inclination as that of the taller plate shaped member A in contact with the wall surface 112 which is behind the nearest-to-wall plate shaped member A1, before the process proceeds to the next step SP4. Otherwise, the process proceeds to the next step SP4 without activating the inclination adjustment member 170.

At the step SP4, the first and second suction discs 140 and 141 are projected outwards from the space 113 to suck up the surface of the nearest-to-wall plate shaped member A1 and then withdraw back into the space 113, so as to draw the nearest-to-wall plate shaped member A1 alone to the wall surface 112. As a result, the nearest-to-wall plate shaped member A1 is vertically erected to make contact with the wall surface 112 and the guiding rail 131, such that there is a clearance with a triangular cross sectional shape formed by the vertically erected nearest-to-wall plate shaped member A1, still inclining second-nearest-to-wall plate shaped member A2, and the flat plate 130. At this point, the height of the upper edge of the vertically erected nearest-to-wall plate shaped member A1 is measured by the image sensor 160, and the measured height is recorded in the control device (not shown), so as to register the accurate height of the nearest-to-wall plate shaped member A1.

Next, at the step SP5, the conveying claw 150 is moved toward the next processing step Y to support the side edge of the vertically erected nearest-to-wall plate shaped member A1 by the claw portion 150b. Here, the first and second suction discs 140 and 141 continue to suck onto the nearest-to-wall plate shaped member A1 such that the conveying claw 150 can move toward the next processing step Y by overcoming the elastic force exerted by the elastic member 142 such that the claw portion 150b can capture the side edge of the vertically erected nearest-to-wall plate shaped member A1.

Then, at the step SP6, whether the side edge holding sensor 158 is in an ON state indicating the detection of the holding of the side edge of the nearest-to-wall plate shaped member A1 or not is judged. In case the side edge holding sensor 158 is in the ON state, the process proceeds to the step SP7 after the sucking by the first and second suction discs 140 and 141 is released, whereas otherwise the process returns to the step SP5 described above to further move the conveying claw 150 toward the next processing step Y side until the holding of the side edge of the nearest-to-wall plate shaped member A1 is detected by the side edge holding sensor 158 at the step SP6.

Next, at the step SP7, the air cylinder 240 is activated to raise the plate shaped claws 220. As a result, the plate shaped claws 220 are raised along the side of the second-nearest-to-wall plate shaped member A2 facing toward the side wall 112. Then, the air cylinder 240 is stopped when an upper edge of the flat plate face 232a of the pushing plate 232 has reached a height level slightly above ½ of the height of the second-nearest-to-wall plate shaped member A2, so as to maintain the plate shaped claws 220 at that height.

Then, at the step SP5, the rod of the swaying cylinder 116 is contracted such that the entire swaying frame 210 is swayed around the pin 215, and the pushing plate 232 is moved toward the second-nearest-to-wall plate shaped member A2 side. In response, the pushing plate 232 is rotated around the pin 231 until the entire flat plate face 232a of the pushing plate 232 makes contact with the second-nearest-to-wall plate shaped member A2 and pushes the second-nearest-to-wall plate shaped member A2 away from the wall surface 112. As a result, the second-nearest-to-wall plate shaped member A2 can be put into a state in which its upper edge is slightly distanced from the vertically erected nearest-to-wall plate shaped member A1.

At this state, the timing for conveying the nearest-to-wall plate shaped member A1 to the next processing step Y is awaited. When this timing comes, at the step SP9, the conveying claw 150 is moved toward the direction of the next processing step Y so as to convey the nearest-to-wall plate shaped member A1 held in the conveying claw 150 to the next processing step Y.

After the completion of this conveying of the nearest-to-wall plate shaped member A1 to the next processing step Y, next at the step SP10, the rod of the swaying cylinder 116 is extended to move the pushing member 230 toward the wall surface 112, such that the pushing plate 232 is separated from the second-nearest-to-wall plate shaped member A2. Then, at the step SP11, the air cylinder 240 is activated to lower the plate shaped claws 220.

Next, at the step SP12, the belt conveyor 122 is re-activated to move the entire plate shaped members A remaining on the feeding unit 120 toward the wall surface 112, just as in the step SP1 described above. At this point, the formerly second-nearest-to-wall plate shaped member A2 is updated to the nearest-to-wall plate shaped member A1.

Then, at the step SP13, whether the tip position detection sensor 133 is in the ON state indicating the detection of the lower edge of the nearest-to-wall plate shaped member A1 or not is judged. In case the tip position detection sensor 133 is in the ON state, the process proceeds to the step SP14 at which the belt conveyor 122 is stopped, whereas otherwise the process returns to the step SP12 described above to further move the entire plate shaped members A toward the wall surface 112 until the lower edge of the next nearest-to-wall plate shaped member A1 is detected by the tip position detection sensor 133 at the step SP13.

At the step SP15, the conveying claw 150 is moved away from the next processing step Y while extending the rod of the side edge detection air cylinder 157 to detect the side edge of the nearest-to-wall plate shaped member A1 facing away from the next processing step Y by the side edge detection sensor 156.

Then, at the step SP16, whether the side edge detection sensor 156 is in the ON state indicating the detection of the side edge of the nearest-to-wall plate shaped member A1 or not is judged. In case the side edge detection sensor 156 is in the ON state, the process proceeds to the step SP17 at which the conveying claw 150 is stopped after the conveying claw 150 is moved to a position at which the claw portion 150b can capture the side edge of the nearest-to-wall plate shaped member A1, whereas otherwise the process returns to the step SP15 described above to further move the conveying claw 150 away from the next processing step Y until the side edge of the next nearest-to-wall plate shaped member A1 is detected by the tip position detection sensor 133 at the step SP13.

At this point, the value obtained by the absolute encoder 157 at a time the side edge of the nearest-to-wall plate shaped member A1 is detected by the side edge detection sensor 156 is registered in the control device (not shown) as the width size of the nearest-to-wall plate shaped member A1.

Also, at this point, a highest vertical position of the upper edge of one of the plate shaped members A that are in contact with the wall surface 112 is scanned from a lower side toward the upper side of the wall surface 112 by the image sensor 160. In a case the image sensor 160 detects the presence of the taller plate shaped member A in contact with the wall surface 112 which is arranged behind the nearest-to-wall plate shaped member A1, the inclination adjustment unit 170 extends its rod 171 outwards against the nearest-to-wall plate shaped member A1 so as to adjust the inclination of the nearest-to-wall plate shaped member A1 to the same inclination as that of the taller plate shaped member A in contact with the wall surface 112 which is behind the nearest-to-wall plate shaped member A1, before the process proceeds to the next step SP18. Otherwise, the process proceeds to the next step SP18 without activating the inclination adjustment member 170.

Next, at the step SP18, whether this conveying operation is to be finished or not is judged. In a case of finishing this conveying operation, the process terminates, whereas otherwise the process returns to the step SP4 described above, so as to continue the operation of the steps SP4 to SP18 for the subsequent plate shaped members A sequentially. Here, when the number of remaining plate shaped members A on the feeding unit 120 decreases, the new plate shaped members may be added onto the feeding unit 120, so as to repeat this conveying operation continuously.

As described, according to this embodiment, the nearest-to-wall plate shaped member A1 is drawn to the wall surface 112 side by means of the first and second suction discs 140 and 141, so that only the nearest-to-wall plate shaped member A1 alone can be drawn to the wall surface 112 and erected vertically accurately.

In addition, at the beginning of the drawing of the nearest-to-wall plate shaped member A1, a vertical position of the lower edge of the nearest-to-wall plate shaped member is slightly above the flat plate 130, so that there is no friction between the lower edge of the nearest-to-wall plate shaped member A1 and the flat plate 130 during this drawing operation. Consequently, it is possible in this embodiment to draw the nearest-to-wall plate shaped member A1 to the wall surface 112 smoothly.

Also, as the nearest-to-wall plate shaped member A1 alone is vertically erected, the clearance with a triangular cross sectional shape is formed by the vertically erected nearest-to-wall plate shaped member A1, still inclining second-nearest-to-wall plate shaped member A2, and the flat plate 130, so that the nearest-to-wall plate shaped member A1 can be completely separated from the other plate shaped members A and consequently only the nearest-to-wall plate shaped member A1 alone can be conveyed to the next processing step Y accurately at one time.

Moreover, the leaning force exerted by the other plate shaped members A toward the wall surface 112 side can be mitigated by the leaning force mitigation member 200, so that the nearest-to-wall plate shaped member A1 can be conveyed to the next processing step Y smoothly, by only a small force, without damaging the nearest-to-wall plate shaped member A1. Consequently, in a case the plate shaped members A are corrugated cardboards, it is also possible in this embodiment to prevent the crushing of the corrugation on the corrugated cardboards during the conveying operation.

Figure 12:
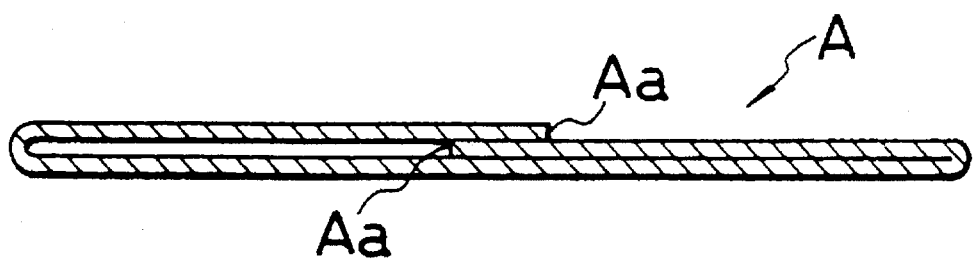
FIG. 12 is a side view of a plate shaped member having a step portion.
Figure 13:
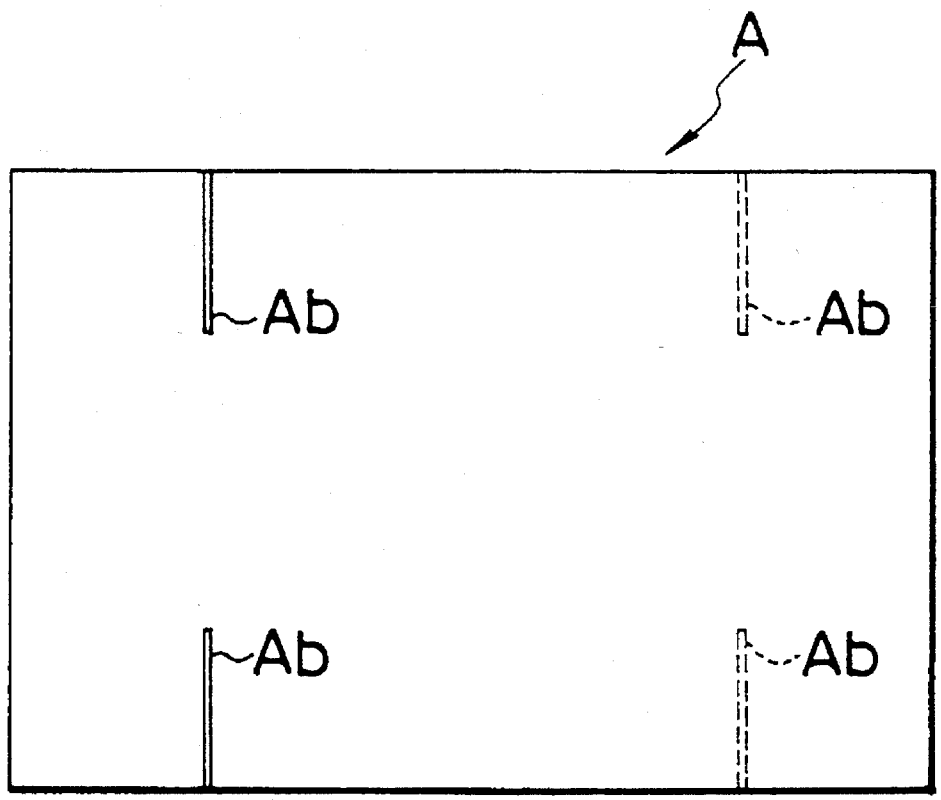
FIG. 13 is a top plan view of a plate shaped member having slit portions.

Furthermore, in this embodiment, the leaning force mitigation member 200 completely separates the nearest-to-wall plate shaped member A1 from the second-nearest-to-wall plate shaped members A2. Consequently, even when each of the plate shaped members A incorporates a step portion Aa as shown in FIG. 12 due to the overlapping, or slit portions Ab as shown in FIG. 13 for forming lid part of the cardboard box for instance, or else each of the plate shaped members A has hooks or staplers attached thereon, it becomes possible to prevent the conveying of the nearest-to-wall plate shaped member A1 from being obstructed due to the accidental engagement of any of the step portion Aa, slit portions Ab, hooks, or staplers, as well as the damaging of the nearest-to-wall plate shaped member A1 or the second-nearest-to-wall plate shaped member A2 during the conveying operation due to the hooks or the staples.

Also, as the belt conveyor 122 is provided to be extending horizontally, so that when the plate shaped members A are to be supplied onto the belt conveyor 122, there is no need to require an enormous amount of work to raise the plate shaped members A to a very high vertical position and then dropping them as in the conventional case, and consequently the plate shaped members A can be supplied easily, without causing the dusts on the plate shaped members A from being stirred up by the impact of the dropping. As a result, it becomes possible in this embodiment to sequentially convey the plate shaped members A to the next processing step Y sequentially.

In addition, as the plate shaped members A are stored in a form of a horizontal arrangement of vertically inclined plate shaped members A, the plate shaped members A in different sizes can be stored in a random order. Moreover, because of this arrangement, it also becomes possible for a plate shaped member of a desired size to be thrusted between the already stored plate shaped members A, or removed from the already stored plate shaped members A. Consequently, this embodiment allows much wider selections of practically useful manners of handling the plate shaped objects.

Furthermore, as the plate shaped members A are sequentially conveyed to the next processing step Y in a state of being vertically erected, it becomes possible for the plate shaped members A to be subjected to the further processing operation such as attaching labels or printing on the surface of each plate shaped member at the next processing step Y, also in a state of being vertically erected. Consequently, it also becomes possible in this embodiment to reduce a floor area required for installing the apparatus for the conveying operation as well as that required by the apparatus for the next processing step Y.

It is to be noted that, although the wall surface 112 has been oriented strictly vertically in the above description, this wall surface 112 may be provided to be slightly inclined from the vertical orientation toward the direction away from the feeding unit 120, so as to stabilize the nearest-to-wall plate shaped member A1 in a state of making contact with the wall surface 112.

It is also to be noted that, although the leaning force mitigation member 200 has been described to have a configuration in which the pushing plate 232 is moved away from the wall surface 112 side by contracting the rod of the swaying cylinder 116 to separate the nearest-to-wall plate shaped member A1 from the second-nearest-to-wall plate shaped member A2, this configuration of the leaning force mitigation member 200 may be modified to a modified configuration in which the pushing plate 232 is fitted to the second-nearest-to-wall plate shaped member A2 by simply raising the plate shaped claws 220 so as to reduce the leaning force of the second-nearest-to-wall plate shaped member A2 with respect to the nearest-to-wall plate shaped member A1. Moreover, in a case the leaning force involved is relatively small, the leaning force mitigation member 200 can be omitted altogether.

Furthermore, it is also possible to provide a sensor for detecting the leaning force exerted by the plate shaped members A. For example, such a leaning force sensor can be formed by load cells for supporting four corners of the wall surface 112 from a back side of the wall surface 112 to detect the force exerted onto the wall surface 112, or by the wall surface 112 made to be freely swayable around its upper edge and the pressure switches for supporting the wall surface 112 at a middle vertical position on the wall surface 112 from a back side of the wall surface 112 for detecting the leaning force exerted onto the wall surface 112.

Figure 11B:
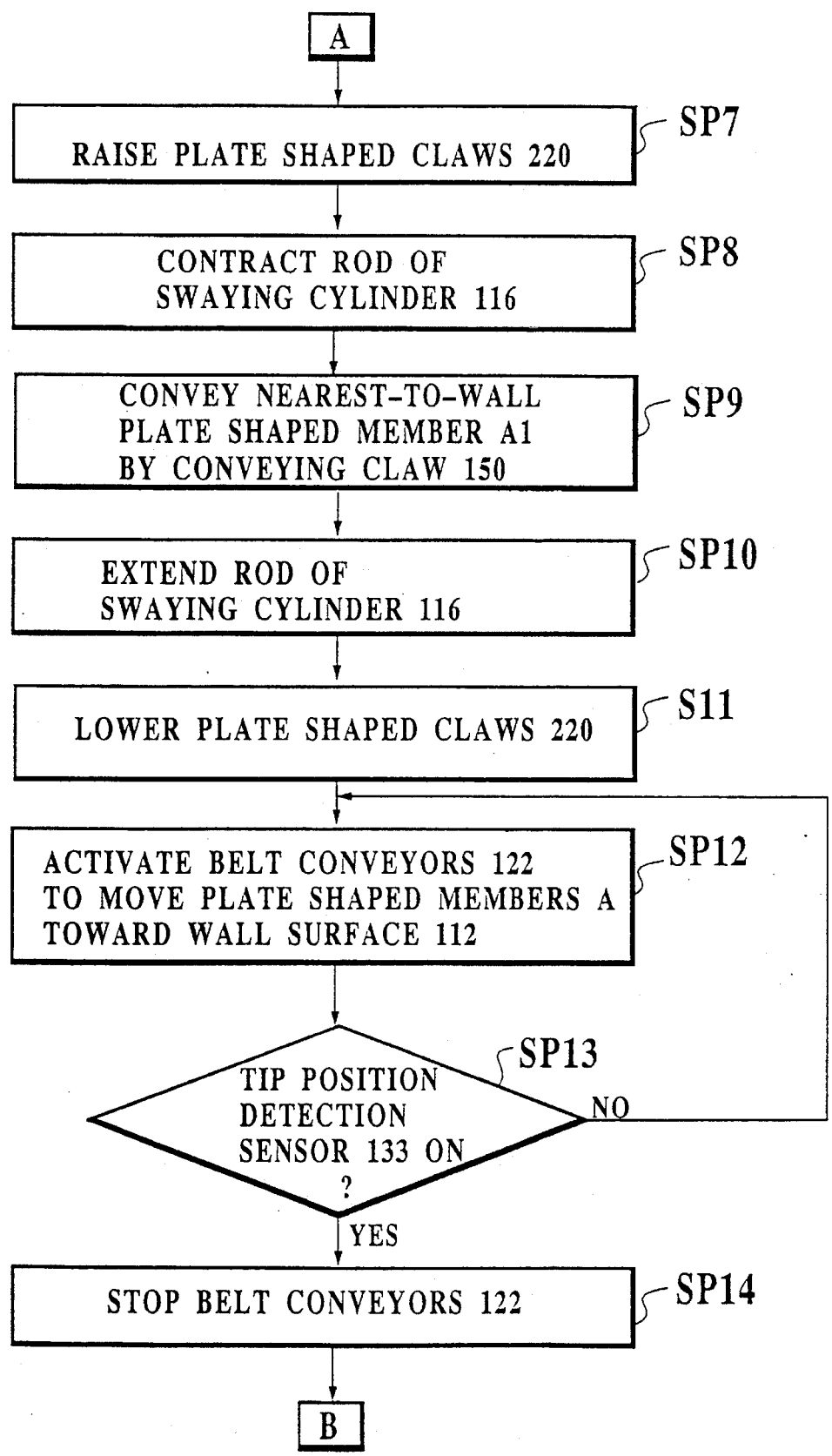
Figure 11C:
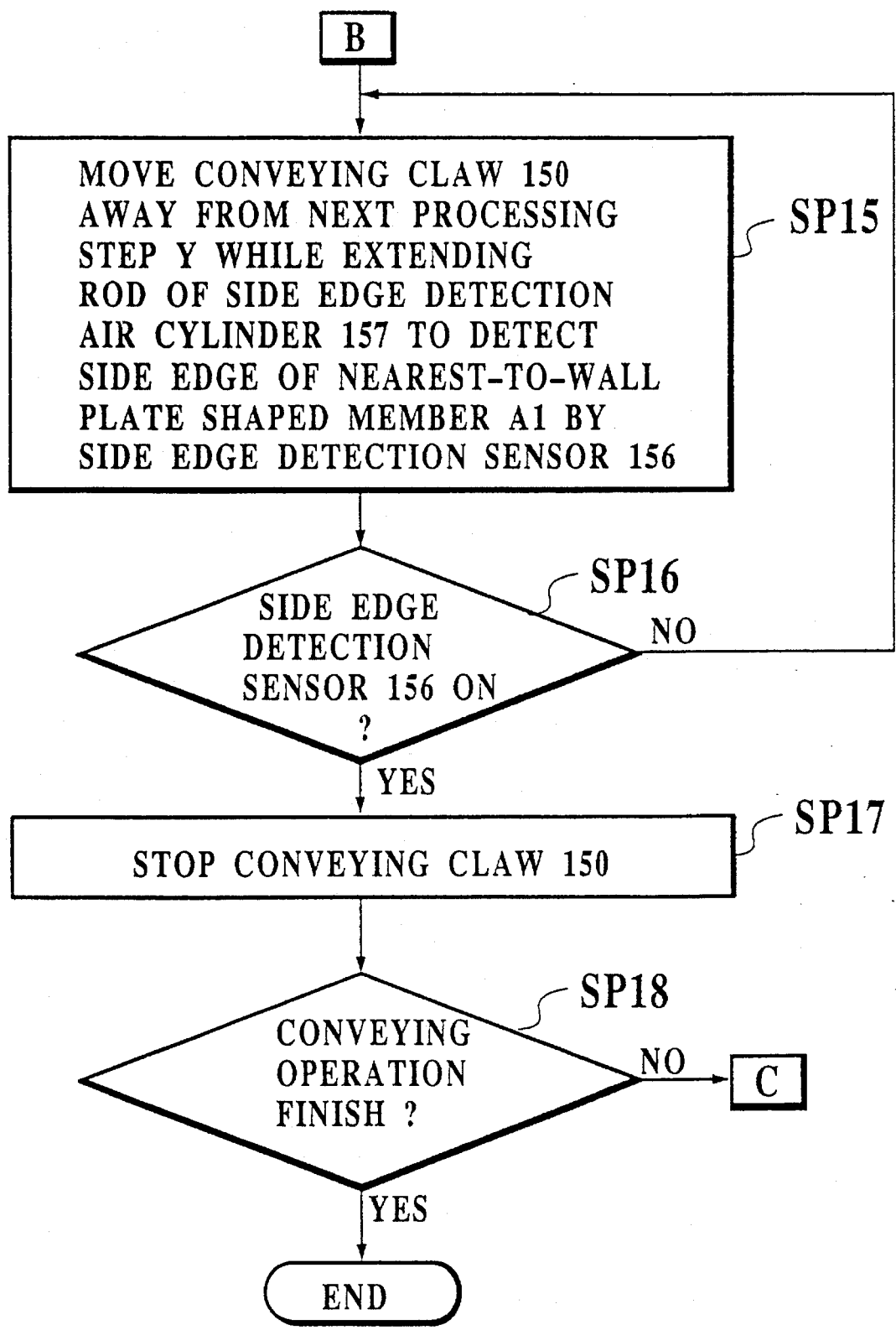

In a case of incorporating such a leaning force sensor, at the step SP6 in the flow chart of FIG. 11, the leaning force exerted onto the wall surface 112 is detected by the leaning force sensor while the holding of the side edge of the nearest-to-wall plate shaped member A1 is detected by the side edge holding sensor 158. Then, when the detected leaning force is greater than the prescribed permissible value stored in the control device, the operation at the step SP7 is carried out as described above, whereas otherwise, the steps SP7 and SP8 are skipped and the process proceeds to the step SP9 next, at which the nearest-to-wall plate shaped member A1 is conveyed out by the conveying claw 150. Then, the steps S10 and SP11 are also skipped and the process then proceeds to the step S12.

In other words, when the detected leaning force is smaller than the permissible value, the nearest-to-wall plate shaped member A1 is conveyed out, without activating the leaning force mitigation member 200 at all. As a consequence, in a case of incorporating the leaning force sensor, the interval between the successive conveying of the plate shaped members A can be shortened as much as the time required for activating the leaning force mitigation member 200. Here, the permissible value can be appropriately set up to a level at which the nearest-to-wall plate shaped member A1 can be conveyed to the next processing step Y by overcoming the friction force caused by the leaning force.

It is also to be noted that each plate shaped member A may not necessarily be the folded plate shaped corrugated cardboard which can be set up into a cardboard box by assembling as described above, and can be any plate shaped member such as a simple flat cardboard or a plate shaped plywood board.

Figure 14:
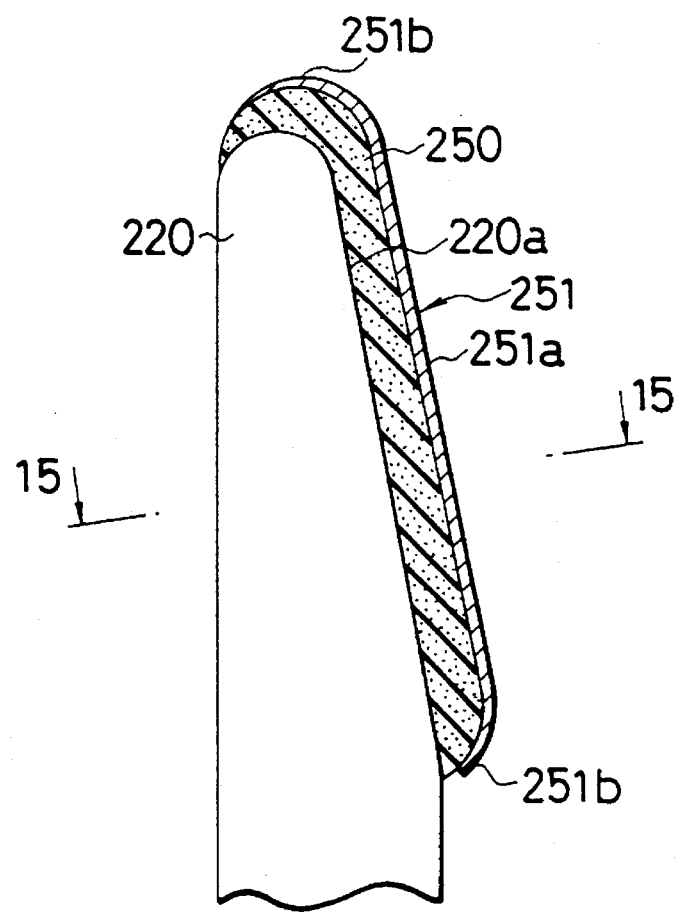
FIG. 14 is an enlarged side view of a modified configuration for a pushing member portion of the apparatus of FIG. 1.
Figure 15:
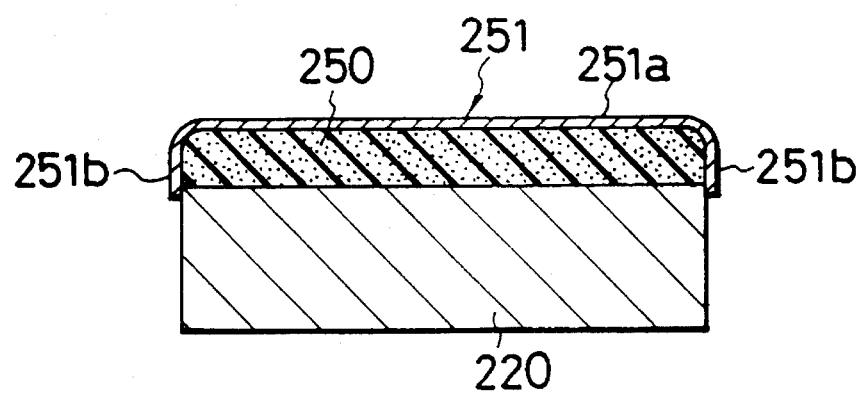
FIG. 15 is an enlarged cross sectional view of a modified configuration of a pushing member portion of the apparatus of FIG. 1 at 15—15 plane indicated in FIG. 14.

It is also to be noted that the pushing member 230 of FIGS. 6 and 7 may be replaced by that shown in FIGS. 14 and 15 in which a pushing plate 251 is attached to the oblique surface 220a of the plate shaped claws 220 through a sponge like elastic member 250. Here, the pushing plate 251 is formed to have a flat plate portion 251a in a form of a rectangular flat face and an integrally formed peripheral surface portion 251b which is smoothly curving from the flat plate portion 251a to surround the elastic member 250. This pushing plate 251 is not fixed to the plate shaped claws 220, so that this pushing plate 251 can make a contact with the second-nearest-to-wall plate shaped member A2 freely when the plate shaped claws 220 are raised to push the second-nearest-to-wall plate shaped member A2.

It is also to be noted that, although the width of the nearest-to-wall plate shaped member A1 has been determined by detecting the position of the side edge of the nearest-to-wall plate shaped member A1 facing away from the next processing step Y with the guiding face 125a of the guide bar 125 as an origin in the above description, the width of the nearest-to-wall plate shaped member A1 may be determined by detecting the positions of both of the side edges of the nearest-to-wall plate shaped member A1, facing toward and away from the next processing step Y.

In such a case, before the conveying claw 150 is moved away from the next processing step Y side at the step SP15, the conveying claw 150 should be moved toward the next processing step Y side once to detect the side edge of the nearest-to-wall plate shaped member A1 facing toward the next processing step Y by the side edge detection sensor 156, and then the conveying claw 150 should be moved away from the next processing step Y side and the process proceeds to the next step SP16.

Here, however, the absolute encoder 155 should be replaced by an incremental type encoder in which the number of pulses generated while the conveying claw 150 is moved from the side edge of the nearest-to-wall plate shaped member A1 facing toward the next processing step Y to the side edge of the nearest-to-wall plate shaped member A1 facing away from the next processing step Y is counted and the width of the nearest-to-wall plate shaped member A1 is calculated from the counted number of pulses. Namely, the leading angle of the screw bolt 153 can be set such that one pulse can be generated from the incremental type encoder whenever the conveying claw 150 moves for 1 mm along the screw bolt 153 for example, and the number of pulses counted from the side edge of the nearest-to-wall plate shaped member A1 facing toward the next processing step Y to the side edge of the nearest-to-wall plate shaped member A1 facing away from the next processing step Y is converted into the length in units of 1 mm, such that the width of the nearest-to-wall plate shaped member A1 can be measured. Here, it is obviously possible to use a different correspondence of one pulse per 0.1 mm, one pulse per 10 mm, or one pulse per any other desired length, to realize the measurement of the width in 0.1 mm precision, 10 mm precision, or any other desired precision.

This case of determining the width of the nearest-to-wall plate shaped member A1 by detecting the positions of both of the side edges of the nearest-to-wall plate shaped member A1, facing toward and away from the next processing step Y, is advantageous in that the width of the nearest-to-wall plate shaped member A1 can be measured accurately even when the nearest-to-wall plate shaped member A1 is not really abutting against and separated from the guide bar 125.

Figure 16:
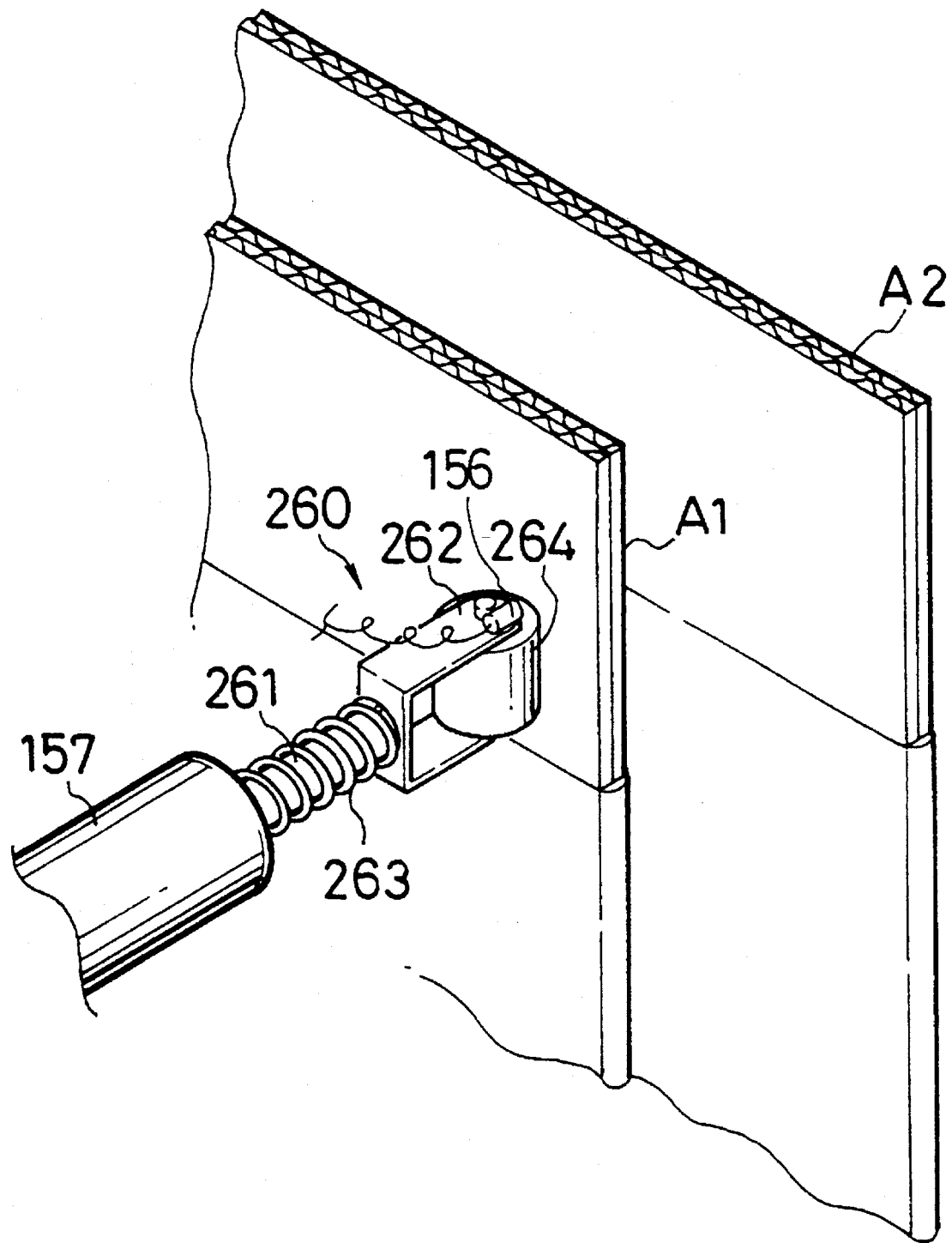
FIG. 16 is an enlarged perspective view of a guide roller mechanism portion that can be incorporated into the apparatus of FIG. 1.

It is also to be noted that, although the side edge detection sensor 156 has been provided at a tip of the rod of the side edge detection air cylinder 157 in the above description, the tip of the rod of the side edge detection air cylinder 157 may be equipped with a freely extendable guide roller mechanism 260 as shown in FIG. 16. This guide roller mechanism 260 comprises: an extendable rod 261 engaged with the rod of the side edge detection air cylinder 157 to be freely extendable in an axial direction; a roller bracket 262 provided at a tip of this extendable rod 261; a coil spring 263 provided on an outer circumferential portion of the extendable rod 261 for exerting the spring force onto the roller bracket 262 in a direction for extending the extendable rod 261; and a roller 264 supported by the roller bracket 262 to be freely rotatable, and for rolling along the plate shaped members A.

In this configuration of FIG. 16, the side edge detection sensor 156 is provided within the roller bracket 262 and detects the side edge of the nearest-to-wall plate shaped member A1 by detecting the light emitted from the side edge detection sensor 156 and reflected back off the nearest-to-wall plate shaped member A1. The side edge detection sensor 156 has the position on the roller bracket 262 determined such that the reflected light that has reached at least a depth equal to ½ of the thickness of the nearest-to-wall plate shaped member A1 from the surface of the nearest-to-wall plate shaped member A1 can be detected by the side edge detection sensor 156.

Thus, even when there is a wider second-nearest-to-wall plate shaped member A2 behind the nearest-to-wall plate shaped member A1, the side edge detection sensor 156 is turned into a state in which the reflected light cannot be detected, as the roller 264 moves from the nearest-to-wall plate shaped member A1 to the second-nearest-to-wall plate shaped member A2, so that the transition to this state is indicative of the detection of the side edge of the nearest-to-wall plate shaped member A1. Here, it is preferable to make the diameter of the roller 264 to be sufficiently larger than the thickness of the nearest-to-wall plate shaped member A1 such that the roller 264 can easily roll from the side edge of the nearest-to-wall plate shaped member A1 to the surface of the second-nearest-to-wall plate shaped member A2.

In a case of using the guide roller mechanism 260 as described above, there is an advantage that the side edges of the nearest-to-wall plate shaped member A1, facing toward and away from the next processing step Y can be detected accurately, as the distance between the side edge detection sensor 156 and the nearest-to-wall plate shaped member A1 remains constant, even when there are some fluctuations for the stopping position of the nearest-to-wall plate shaped member A1.

It is finally to be noted that, besides those already mentioned above many modifications and variations of the above embodiment may be made without departing from the novel and advantageous features of the present invention. Accordingly, all such modifications and variations are intended to be included within the scope of the appended claims.

What is claimed is:

1. An apparatus for temporal storing and conveying of plate shaped members, comprising:

a substantially vertical wall surface;

feeding means for temporarily storing the plate shaped members in a state of obliquely leaning against the wall surface, and feeding the stored plate shaped members toward the wall surface sequentially;

separation means for drawing a nearest-to-wall plate shaped member among the stored plate shaped members to the wall surface in order to vertically erect the nearest-to-wall plate shaped member along the wall surface and separate the nearest-to-wall plate shaped member from remaining stored plate shaped members; and conveying means for conveying the vertically erected nearest-to-wall plate shaped member to a next processing step along the wall surface.

2. The apparatus of claim 1, wherein the separation means separates the nearest-to-wall plate shaped member from the remaining stored plate shaped members by forming a clearance between the nearest-to-wall plate shaped member and a second-nearest-to-wall plate shaped member among the remaining stored plate shaped members as a result of drawing only the nearest-to-wall plate shaped member to the wall surface.

3. The apparatus of claim 1, wherein the separation means includes suction means for sucking onto a surface of the nearest-to-wall plate shaped member and drawing the nearest-to-wall plate shaped member to the wall surface.

4. The apparatus of claim 1, wherein the conveying means includes conveying claw means for holding a side edge of the nearest-to-wall plate shaped member and pushing the nearest-to-wall plate shaped member toward the next processing step.

5. The apparatus of claim 4, wherein the conveying means includes a side edge detection sensor for detecting the side edge of the nearest-to-wall plate shaped member to be held by the conveying claw means.

6. The apparatus of claim 1, further comprising leaning force mitigation means for reducing a leaning force exerted by the stored plate shaped members against the wall surface.

7. The apparatus of claim 6, wherein the leaning force mitigation means reduces the leaning force by being inserted between the nearest-to-wall plate shaped member and a second-nearest-to-wall plate shaped member among the remaining stored plate shaped members to support the remaining stored plate shaped members separated from the nearest-to-wall plate shaped member by the separation means.

8. The apparatus of claim 1, further comprising: inclination adjustment means for adjusting an inclination of the nearest-to-wall plate shaped member to be equal to an inclination of a taller one of the remaining stored plate shaped members which is contacting with the wall surface.

9. The apparatus of claim 1, further comprising:

width measurement means for measuring a width of the nearest-to-wall plate shaped member; and height measurement means for measuring a height of the nearest-to-wall plate shaped member.

10. The apparatus of claim 1, wherein the feeding means includes a horizontally extending belt conveyor on which the plate shaped members in the state of leaning against the wall surface are mounted.

11. A method for temporal storing and conveying of plate shaped members, comprising the steps of:

(a) providing a substantially vertical wall surface;

(b) temporarily storing a plurality of plate shaped members in a state of obliquely leaning against the wall surface, and sequentially feeding the stored plate shaped members toward the wall surface;

(c) drawing a nearest-to-wall plate shaped member among the stored plate shaped members to the wall surface in order to vertically erect the nearest-to-wall plate shaped member along the wall surface and separate the nearest-to-wall plate shaped member from remaining stored plate shaped members; and (d) conveying the vertically erected nearest-to-wall plate shaped member to a next processing step along the wall surface.

12. The method of claim 11, wherein at the step (c), the nearest-to-wall plate shaped member is separated from the remaining stored plate shaped members by forming a clearance between the nearest-to-wall plate shaped member and a second-nearest-to-wall plate shaped member among the remaining stored plate shaped members as a result of drawing only the nearest-to-wall plate shaped member to the wall surface.

13. The method of claim 11, wherein at the step (c), the nearest-to-wall plate shaped member is drawn to the wall surface by suction means for sucking onto a surface of the nearest-to-wall plate shaped member and drawing the nearest-to-wall plate shaped member to the wall surface.

14. The method of claim 11, wherein at the step (d), the nearest-to-wall plate shaped member is conveyed by conveying claw means for holding a side edge of the nearest-to-wall plate shaped member and pushing the nearest-to-wall plate shaped member toward the next processing step.

15. The method of claim 14, further comprising the step of (e) detecting the side edge of the nearest-to-wall plate shaped member to be held by the conveying claw means before the step (d).

16. The method of claim 11, further comprising the step of (f) reducing a leaning force exerted by the stored plate shaped members against the wall surface after the step (c).

17. The method of claim 16, wherein at the step (f), the leaning force is reduced by inserting leaning force mitigation means for supporting the remaining stored plate shaped members separated from the nearest-to-wall plate shaped member at the step (c), between the nearest-to-wall plate shaped member and a second-nearest-to-wall plate shaped member among the remaining stored plate shaped members.

18. The method of claim 11, further comprising the step of (e) adjusting an inclination of the nearest-to-wall plate shaped member to be equal to an inclination of a taller one of the remaining stored plate shaped members which is contacting with the wall surface.

19. The method of claim 11, further comprising the steps of:

(e) measuring a width of the nearest-to-wall plate shaped member; and (f) measuring a height of the nearest-to-wall plate shaped member.

20. The method of claim 11, wherein at the step (b), the plate shaped members are fed by a horizontally extending belt conveyor on which the plate shaped members in the state of leaning against the wall surface are mounted.

* * * * *